April 12, 1949.    L. KRAUS    2,466,713
HAND MOUNT FOR CAMERAS
Filed April 16, 1946
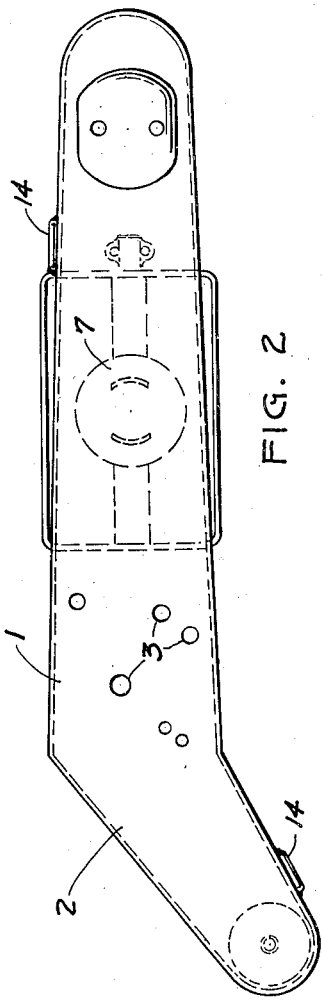
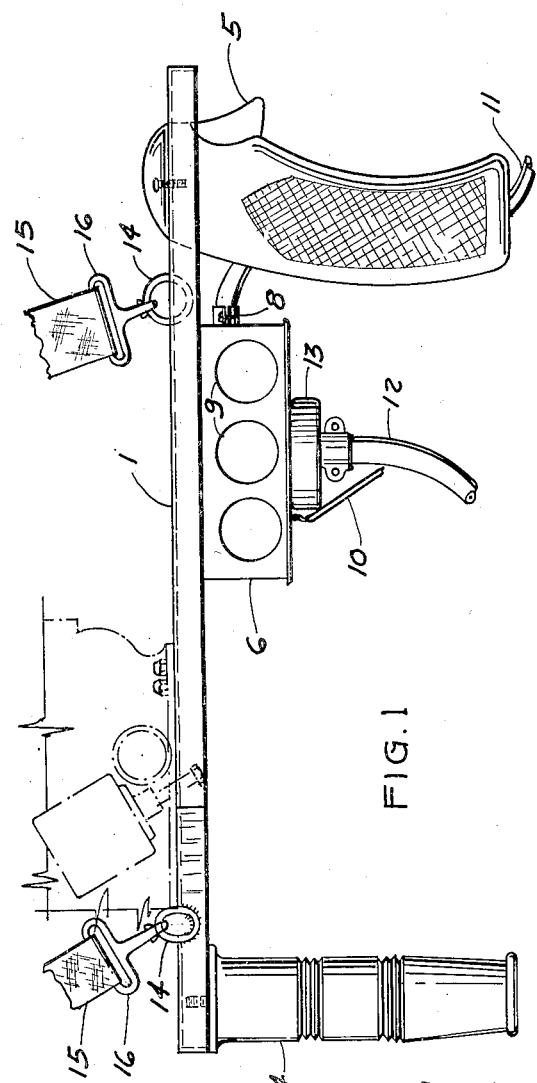
Inventor
LAZARUS KRAUS
By F. J. Schmitt
Attorney Patented Apr. 12, 1949

2,466,713

UNITED STATES PATENT OFFICE 2,466,713

HAND MOUNT FOR CAMERAS

Lazarus Kraus, United States Navy, Brooklyn, N. Y.

Application April 16, 1946, Serial No. 662,430

1 Claim. (Cl. 95—86)

(Granted under the act of March 3, 1883, as amended April 30, 1928; 370 O. G. 757)

This invention relates to a camera mount and particularly to a portable hand-held type of camera mount for electrically driven motion picture cameras, or to spring powered cameras.

The practice of mounting a motion picture camera on a tripod is cumbersome and motion is naturally limited to the swing of the tripod. The present mount permits filming of combat action or any other situation where there is need for following subjects in rapid and erratic motion and permits filming of sequences which could not be obtained while limited to the swing of a tripod or to the unsteadiness of the usual hand-held arrangements.

The object of this invention is to provide a camera mount which offers a great degree of steadiness and maneuverability.

Details of the invention are described in connection with the following figures in which Fig. 1 is an elevation of the camera mount, showing the camera schematically in dotted lines; and Fig. 2 is a plan view.

The drawings show platform 1, preferably of flanged sheet metal. Platform 1 is shown with the rear portion 2 offset as shown, for a purpose later described. A suitable number of perforations 3 are provided in the platform by means of which a camera can be mounted and secured.

Rear portion 2 is provided with handle 4 on its underside which may be secured by means of a screw thread, as shown, or by any other suitable means such as welding. The forward portion of the platform 1 is provided with a trigger switch 5 on its underside which may be of any well known design.

Connection box 6 is secured to the underside of platform 1 in any suitable manner, such as by welding. The box is shown as made of sheet metal and contains a socket member 7 which is connected to cable clamp 8. Knockout holes 9 may be provided along the sides of the box for easier access. Spring cover 10 may be provided to keep foreign matter from the socket when not in use.

Cable 11 extends from cable clamp 8 through trigger switch 5 and to a suitable source of power. To connect the camera motor to the power source, it is merely necessary to plug motor cable 12 into socket member 7 by means of suitable plug 13 and to operate the trigger switch 5. It will be apparent that trigger control of power can be obtained without removing the hands from the mount.

Between shots, the platform and camera are suspended by means of strap 15 which is fastened at its ends to the platform 1 and is placed over the head of the operator. Rings 14 are secured at opposite ends of platform 1 preferably by welding. Each opposite end of strap 15 is provided with a snap fastener 16 which can be readily snapped onto rings 14. Suitable length adjustments may be provided in strap 15 if so desired. The strap serves as a safety against dropping the camera, and supports the weight of the camera between shots.

The angular arrangement of portion 2 of the platform mount makes for more convenient handling.

The invention described herein may be manufactured and used by or for the Government of the United States of America for governmental purposes without the payment of any royalties thereon or therefor.

What is claimed is:

A hand mount for an electrically driven motion picture camera comprising a relatively thin, substantially flat and elongated platform, fore and aft hand grips depending from the ends of said platform, the fore grip being of the pistol type and embodying a switch operable by an outwardly projecting trigger, an electrical receptacle secured to the bottom of said platform adjacent said fore grip, and electrical connections to and between said switch and said receptacle whereby an open or closed circuit may be established for the mounted camera.

LAZARUS KRAUS.

REFERENCES CITED

The following references are of record in the file of this patent:

UNITED STATES PATENTS

| Number | Name | Date |
|---|---|---|
| 2,140,051 | Hart | Dec. 13, 1938 |
| 2,314,033 | Curran | Mar. 16, 1943 |
| 2,370,611 | DuMais | Feb. 27, 1945 |